United States Patent Office 3,721,605
Patented Mar. 20, 1973

3,721,605
PROCESS FOR PRODUCING AMYLOSE IN
INDUSTRIAL SCALE
Mikihiko Yoshida and Hirao Mamoru, Okayama, Japan, assignors to Hayashibara Company, Okayama, Japan
No Drawing. Filed Apr. 14, 1970, Ser. No. 28,512
Claims priority, application Japan, Apr. 15, 1969, 44/29,171
Int. Cl. C13l 1/08
U.S. Cl. 195—31 R                        10 Claims

ABSTRACT OF THE DISCLOSURE

This invention relates to a process for producing amylose chiefly composed of macromolecular amylose from starch rich in amylose by heat gelatinizing the starch and then rapidly cooling to a temperature in the range of 50–60° C. and treating with a heat-resistance α-1,6-glucosidase. The reaction mixture is then further cooled to a temperature of 40–50° C. and treated with a second α-1,6-glucosidase in order to complete debranching of the amylopectin therein and permit precipitation of the amylose. The resultant macromolecular amylose may then be separated therefrom.

---

This invention relates to a process for producing amylose chiefly composed of macromolecular amylose from starch rich in amylose by hydrolyzing the branched part of amylopectin contained therein into linear chain amylose by means of α-1,6-glucosidase.

Starch produced on or in the ground, for example, in potato, sweet potato, tapioca, sago, wheat, corn, etc. consists of amylose exclusively composed of α-1,4-glucoside bond and macromolecular amylopectin composed of linear molecular chains containing exclusively α-1,4-glucoside bond and connected mutually by α-1,6-glucoside bond to form many branchings. Ordinary starch is known to contain 20–25% of this amylose. Amylose is a macromolecular linear compound with the degree of polymerization exceeding 1,000, shows partial crystallinity and has film forming properties due to the structure thereof similar to that of cellulose. On the other hand, amylopectin has a complicated branched structure and is easily swelled to form a gel. A solution thereof shows a high viscosity and may be utilized as an adhesive.

Thus, natural starch is a mixture of amylose and amylopectin with different properties, and it is almost impossible to obtain a starch of constant properties due to the variation in mixed ratio of these two substances as well as in the molecular weight thereof. Consequently in the applications of starch it is impossible to utilize these two components completely.

For example, in connection with the influence of amylopectin content on the flexibility of amylose film, the bending resistance of 1,400 of pure amylose film is decreased to less than 1/10 at an amylopectin content of 50% and further lowered when this content is as high as 80% as in the case of ordinary starch. This example clearly shows that the presence of even a small amount of amylopectin remarkably deteriorates the property of the film.

Though amylopectin can be obtained in pure state as the starch of seed of ilex, pure amylose cannot be obtained as a natural product. Recent inventigation of plant variations succeeded in providing amylomaize with an amylose content of 80% on an experimental scale, species available in large amount only provide a content of 50–60%, still containing amylopectin of about 50% and thus being still far from pure amylose. Besides even the present amylomaize is quite expensive.

Thus many attempts have been made to separate amylose and amylopectin contained for example in potato starch, and the products of the process according to which starch in paste state is subjected to selective precipitation by the addition of salts have already been placed onto the market. In these products, however, amylose still contains about 20% of amylopectin and has the degree of polymerization of about 200, showing considerable degradation of natural amylose.

Consequently it has been impossible, up to the present time, to produce pure amylose free from amylopectin, a macro-molecular substance of different structure on an industrial scale.

On the other hand, the demand for pure macromolecular amylose is widespread due to the excellent properties thereof recognized by the development of amylomaize starch and the investigations for the applications thereof.

On the basis of these facts, the present inventors have carried out extensive investigations on the industrial production of macromolecular amylose by decomposition of the amylopectin contained in amylose-containing starch, particularly amylose-rich starch, namely amylomaize starch, or crude amylose separated from starch, by means of various enzymes including heat resistant alpha-1,6-glucosidase recently developed by the present inventors thereby modifying amylopectin into an amylose-like molecule to obtain uniform amylose thereby enabling full utilization of the characteristics thereof.

As the result, the present inventors have determined that, since amylopectin inevitably associated with amylose as described before has a branched structure due to the alpha-1,6-glucoside bond, the branched portions exclusively can be decomposed by means of alpha-1,6-glucosidase which shows activity exclusively on the alpha-1,6-bond in the branched parts to give linear molecules similar to amylose with uniform structure and properties. Raw amylose can enable the full utilization of the properties of amylose by treatment with alpha-1,6-glucosidase, and the inventors have reached this invention by establishing an industrial manufacturing process.

The enzyme alpha-1,6-glucosidase to be employed in this invention is found to be produced by *Escherichia intermedia* ATCC 21073 (disclosed in Japanese Pat. No. 520,931) and *Pseudomonus amyloderamosa* ATCC 21262 found by the present inventors. Also it has already been found that alpha-1,6-glucosidase is produce by the stock strains of 11 genera (Agrobacterium, Azotobacter, Leuconostoc, Mycobacterium, Pediococcus, Sarcina, Serratia, Staphylococcus, Streptococcus, Bacillus, and Erwinia) as well as Micrococcus, Nocardia and Lactobacillus. Furthermore it is found that heat resistant enzyme is effectively produced by the strains of 5 genera (Streptomyces, Actinomyces, Nocardia, Micromonospora, and Thermonospora) belonging to Actinomycets. Among the more than ten productive strains mentioned above, the strains of Lactobacillus and those belonging to Actinomycetes provide heat resistant enzymes which show an active temperature range of 50–60° C. in comparison with 30–40° C. in the case of other strains, and this fact is an indispensable important property for industrial treatments particularly those with enzyme and sugar which should be strictly kept away from the contamination by miscellaneous micro-organisms.

Alpha-1,6-glucosidase produced from *Pseudomonas amyloderamosa* is identical to others with respect to the capability of hydrolyzing alpha-1,6-bonds in starch but is provided with a lower active pH range of 3 to 7 in comparison with 4 to 7 in the latter and seem to be particularly suitable for the manufacture of amylose due to the reaction mechanism thereof which is different from that of others. In this enzyme it is to be noted that the amylose produced precipitates even during the reaction thereof, facilitating the separation and purification as will be explained in detail later.

As regards the starch to be employed as raw material for the process of this invention, any starch containing amylose is capable of realizing at least a part of the invention, though the resulting product will be rich in shorter chain components. Thus it is preferred to employ starch with as high an amylose content as possible such as amylomaize starch. Also amylose separated from starch can be satisfactorily utilized for this purpose.

Liquification of such starch or turning thereof into paste should be carried out by heating at a temperature as low as possible without contact with air and, if possible, after the removal of dissolved oxygen and in a stream of inert gas such as nitrogen gas, in order to obtain long-chain amylose by preventing the degradation thereof by heating and air oxidation to shorter chains. Consequently, in the examples embodying the process of this invention the contact with air is prevented by heating starch previously at 50° C. which is lower than the temperature for turning to paste, then removing oxygen in a vacuum degassing tank and heating in a totally closed liquifier. Heating is carried out at 70–130° C., preferably at a temperature as low as possible. Also the use of ultrasonic waves is possible at such strength as not to cause degradation of amylose. The concentration of starch is chosen to be 5 to 15%, preferably 5 to 10%, since a concentration exceeding this value will result in excessive viscosity and thus will interfere with the effect of the enzyme.

The starch brought into the paste state is rapidly cooled to 40–60° C. and treated with alpha-1,6-glucosidase. In order to maintain the enzyme in a stable state, the reaction temperature should be lower than 60° C., or lower than 50° C. in case the enzyme is not heat resistant. In this operation it is necessary to cool the starch paste as quickly as possible and to start the treatment with enzyme, since otherwise macromolecular anylose has high viscosity and shows retrogradation, making the debranching of amylopectin incomplete. For this purpose it is desirable to spray the starch into a vacuum cooling tower associated with the spray of enzyme thereby realizing rapid cooling and mixing simultaneously. The mixture is taken out continuously and forwarded to a mixing tank in which hydrolysis is already proceeding. In this tank the mixture is further mixed for 1–3 hours to lower the high viscosity thereof preventing retrogradation thereof. The mixture thus hydrolyzed is sent to large reaction tanks in batches and subjected to further reaction at 40–60° C. under regulated pH.

Particularly a heat resistant enzyme obtained from Lactobacillus and Actinomycetes is convenient in this case because of the adaptability thereof for reaction at high temperature, and it is preferred that the reaction proceed in the steps. In this case the paste is rapidly cooled to 60° C., mixed with the heat resistant enzyme, then it is made to stay in the mixing tank until the viscosity thereof is lowered, and after cooling to 40–50° C., it is transferred to a main reaction tank where the main reaction is carried out.

Also it is possible to utilize the heat resistant enzyme only for an initial reaction by adding this enzyme into the paste cooled to about 60° C., lowering the viscosity thereof during the stay in the mixing tank and further adding, at the main reaction, another suitable enzyme which is active at a lower temperature such as that obtainable from Pseudomonus.

As a special example, it is further possible to mix the enzyme to be employed in the process of this invention with an enzyme of different characteristics obtainable from other strains, for example by mixing the enzyme from Pseudomonus with that from other strains, or to add the two enzymes at different times in a desired order. The mixed use of the enzyme of Pseudomonus and that of other strains is particularly advantageous for the succeeding procedure.

The total amount of enzyme added is desired to be within a range of 20 to 50 units/g. starch.

The reaction is completed within 20–48 hours, during which time long chain amylose molecules are precipitated. A major part of the amylose can be separated as a precipitate by centrifuging at the suitable stage of precipitation and concentrating the liquid phase in vacuum to ½–⅓ of the original volume thereof. The degree of polymerization and degree of branching of such amylose can be determined respectively by periodic acid oxidation method and Smith's decomposition method (reported by F. Smith in J. Am. Chem. Soc., 78, 5910 (1956)). As a result the degree of polymerization of the precipitate and the dissolved part is found respectively to be 700–800 and 100–200, thus the latter clearly contains amylose molecules of lower molecular weight. On the other hand, with respect to the degree of branching, the former is free from branchings whereas the latter contains 1–2 branchings. For comparison the decomposition with beta-amylase in a diluted solution of 1–0.5% shows nearly complete decomposition, without leaving branchings. From these facts it is confirmed that the products obtained according to the process of this invention is provided with the desired degree of polymerization and linear-chain structure, and thus it is made possible to produce desirable pure amylose on an industrial scale. The present invention is extremely valuable from an industrial point of view, since the product therefrom can be utilized for special purposes such as for the manufacture of edible film, fine foam material, etc. and particularly as powerful raw material in the food and pharmaceutical industries because of the digestability thereof.

Preparation of enzyme and measurement of activity thereof

The enzyme employed in the process of this invention are as follows: beta-amylase was extracted from wheat bran (British Pat. No. 1,130,398). Alpha-1,6-glucosidase was obtained from *Pseudomonus amyloderamosa* ATCC 21262, *Escherichia intermedia* ATCC 21073 and other Actinomycetes strains including *Streptomyces diastatochromogenes* IFO 3337, *Actinomyces globisporas* IFO 12208, *Nocardia asteroides* IFO 3384, *Micromonospora melanospora* IFO 12515 and *Thermonospora virides* IFO 12207, and also obtained from *Agrobacterium tumefaciens* IFO 3085, *Azotobacter indicus* IFO 3001, *Erwinia aroideae* IFO 3057, *Lactobacillus plantarum* ATCC 8008, *Leuconostoc mesenteroides* IFO 3426, *Mycobacterium phlei* IFO 3158, *Micrococcus lysodeikticus* IFO 3333, *Pediococcus acidilactici* IFO 3884, *Serratia indicia* IFO 3759, *Streptococcus fecalis* IFO 3128 and *Staphylococcus aureus* IFO 3061. The activity of beta-amylase was determined by reacting the mixture of 5 ml. of 1% solution of soluble starch, 4 ml. of 0.1 M acetate buffer and 1 ml. of enzyme solution for 30 minutes at 40° C. and measuring the resulting reducing sugar as maltose. Thus the activity of enzyme was defined as 1 unit when 10 mg. of maltose was produced.

The activity of alpha-1,6-glucosidase was determined by reacting a mixture of 1 ml. of enzyme solution, 5 ml. of 1% solution of soluble starch of glutinous rice and 1 ml. of 0.5 M acetate buffer (pH 6.0) for 30 minutes at 40° C., then adding 0.1 ml. of the reaction mixture to 0.5° ml. of 0.01 M iodine-potassium iodide solution and 15 ml. of 0.01 N sulfuric acid and measuring 15 minutes later the optical absorbance at 620 m$\mu$ of blue violet coloration thus formed. The obtained value was compared with the value measured at 0 time of the reaction, and the activity of enzyme solution was defined as 1 unit when the difference of absorption was 0.01.

Preparation of enzyme solution (1) *Escherichia intermediate* ATCC 21073 of a platinum spatula amount was inoculated in 100 ml. of cultivation medium containing 0.5% of maltose, 0.8% of peptone and 0.5% of sodium nitrate placed in a Sakaguchi's flask and subjected to reciprocating shaking of 125 cycles/minute. The activity of alpha-1,6-glucosidase in the cultivation mixture reached the maximum value at the end of shaking cultivation at 30° C. for 48 hours, when the microorganism was removed by centrifuging to obtain solution containing enzyme.

Then the enzyme was separated from said isoamylase-containing solution by dehydrating the portion precipitated within a range of 15–48% of ammonium sulfate, and the enzyme thus obtained was employed in the form of enzyme solution of fixed concentration. The optimum pH and temperature of said enzyme were 5.5–6.0 and 45° C., respectively.

(2) *Pseudomonus amyloderamosa* SB-15 ATCC 21262 was inoculated in a sterilized cultivation medium of pH 7 containing 2% of maltose, 0.2% of sodium glutamate, 0.3% of $(NH_4)_2HPO_4$, 0.1% of $KH_2PO_4$ and 0.05% of $MgSO_4.7H_2O$ and was cultivated with shaking for 120 hours at 30° C. The measurement of activity after the cultivation revealed the presence of 180–220 units/ml. of cultivation mixture. The cultivation mixture was centrifuged at 10,000 r.p.m. for 10 minutes to obtain supernatant liquid, which was successively added with cold acetone to 75% concentration under cooling and agitation to precipitate enzyme. The precipitate thus obtained was separated by centrifuging and freeze-dried in vacuum to obtain powdered alpha-1,6-glucosidase with a yield of 80–90%. The product thus obtained is stable in dried state, and can be purified by salting out with ammonium sulfate or other suitable methods. This enzyme has optimum pH value at 3, but is stable within a pH range of 3–6, and the active temperature range is 40–50° C.

(3) *Lactobacillus plantarum* ATCC 8008 was inoculated in 7 ml. of a cultivation medium containing 1% of peptone, 0.5% of yeast extract, 0.1% of $K_2HPO_4$, 0.05% of NaCl, 0.0002% of $MgSO_4.7H_2O$, 0.7% of liquified starch and 0.5% maltose, subjected to standing cultivation for a day at 30° C., then transferred to 10 l. of cultivation medium and further subjected to standing cultivation for 2 days at 30° C. At the end of the period, the cultivation mixture showed a pH of 4.0, the activity of intracellular enzyme of 16 units/ml. the activity of extracellular enzyme of 17 units/ml. and total activity of 33 units/ml.

*Micrococcus lysodeikticus* IFO 3333 of a platinum spatula amount obtained fresh cultivation on slanted medium was inoculated in 100 ml. of a cultivation medium of pH 7.0 containing 1% of maltose, 0.5% of peptone, 0.25% of yeast extract, 0.2% of urea, 0.2% of meat extract, 0.1% of $K_2HPO_4$, 0.45% of KCl and 0.05% of $MgSO_4.7H_2O$ and cultivated for one day. Four batches of thus obtained cultivation mixture were transferred into a 20 l. cultivating jar and further cultivated under aeration for 3 days at 30° C. under agitation of 200 r.p.m. The final pH was 8.2.

The activity in and outside bacteria was 12 and 39 respectively, thus giving a total activity of 51 units/ml.

Two cultivation mixtures mentioned above were centrifuged to obtained microorganisms, which were then washed once with pure water, then suspended in a 1/10 volume of the cultivation mixtures of buffer of pH 7.0 containing 0.1% of sodium-dodesul sulfate (SDS), subjected to self-digestion under shaking for 2 days at 30° C. and centrifuged. The resulting supernatant liquid was mixed with ammonium sulfate to 0.8 saturation, and the resulting precipitate was dissolved in water, then subjected to dialysis with water for a day and centrifuged to obtain supernatant liquid which was employed as enzyme solution.

The optimum pH was found to be 5–6.5 and 6–7 respectively in case of Lactobacillus and Micrococcus, while the optimum temperature was about 50–60° C. and 45° C. respectively, showing that the former enzyme is more heat resistant than other enzymes.

(4) Strains belonging to Actinomycetes, namely of Streptomyces, Actinomyces, Norcardia, Micromonospora and Thermonospora were inoculated in a platinum spatula amount in the cultivation media of pH 7 containing 1% of liquified starch, 0.5% of peptone, 0.5% of meat extract and 0.5% of NaCl and previously sterilized by ordinary method at 120° C. for 20 minutes, and cultivated with shaking in a 1000 ml. flask for 4 days at 30° C.

The obtained enzyme solution was salted out with ammonium sulfate added to 0.4–0.6 saturation, then treated with 0.02 N acetic acid buffer of pH 7.0, absorbed by DEAE-cellulose and eluted with 0.02 N acetate buffer plus 0.5 NaCl solution thereby obtaining partially purified enzyme.

The enzyme has optimum pH and optimum temperature at 5.0–7.0 and 50–60° C., showing larger heat resistance compared with other enzymes.

(5) The other enzyme-producing strains, namely of Agrobacterium, Azotobacter, Bacillus, Erwinia, Leuconostoc, Mycobacterium, Pediococcus, Sarcina, Serratia, Staphylococcus and Streptococcus were inoculated in the sterilized cultivation media containing 1.0% of peptone, 0.5% of yeast extract, 0.1% of $K_2HPO_4$, 0.05% of NaCl, 0.05% of $MgSO_4.7H_2O$, 0.001% of $FeSO_4$ and 0.1% of liquified starch and cultivated under shaking in a 1000 ml. flask for 4 days. Centrifuged microorganism was suspended in a buffer solution containing 0.1% of SDS, then subjected to self-digestion with rotary shaking for 2 days at 30° C. The obtained supernatant liquid (from microorganism) and that of cultivation mixture were purified by salting out with ammonium sulfate added to 0.8 saturation, then dissolving the obtained precipitate with water, and carrying out dialysis for 24 hours. The supernatant obtained after centrifuging was used as enzyme solution. Optimum pH and optimum temperature were about 5–7 and 45–50° C., respectively.

EXAMPLE 1

Amylomaize starch, after purification, was made into 5% aqueous suspension, which was then regulated to pH 6.0 and changed into paste by heating at 100° C. with agitation in a totally closed vessel or in a nitrogen gas stream. After a homogeneous paste was obtained, the pH was again regulated to 4.0. The paste was rapidly cooled to 45° C., then mixed with 50 units of enzyme obtained from Pseudomonas (purified by salting out) and subjected to reaction for 2 days at 45° C. During the course of this period an increase of white precipitate was observed. After the completion of reaction, precipitated amylose was separated by centrifuging, then suspended in equal amount of water and again centrifuged, and the precipitate thus obtained was dried in vacuum under room temperature.

The supernatant liquid was concentrated to half volume under reduced pressure and kept at 5° C. for 12 hours, and the resulting precipitate was separated, washed with water and dried in vacuum, or spray-dried from 20–40% aqueous solution to obtain porous powder. The yield was 40% and 30% respectively in former and latter. The degree of polymerization measured by periodic acid oxidation method was 800 and 120 respectively, and the number of branchings measured by Smith's decomposition method showed almost zero and about one branching per molecule. The decomposition of these products with beta-amylose in 0.5% solution for 12 hours at pH 6.0 and at 55° C. showed the yield in maltose of 100% and 85%, thus indicating that the former product consists of pure amylose while the latter contains trace amounts of branchings.

EXAMPLE 2

Amylomaize starch was purified and made into 5% suspension. After the regulation of pH to 6.0, the suspension was turned into paste and cooled as shown in Example 1, and successively treated with the enzymes produced by Lactobacillus and Actinomyces strains including Streptomyces, Actinomycetes, Nocardia, Micromonospora and Thermonospora at pH 6.0 and 50° C. The cultivation mixtures were treated similarly as in Example 1 to give the results showing in the following table.

TABLE 1

| Enzyme used | Amount of enzyme units/g. starch | Precipitate | | Soluble part | |
|---|---|---|---|---|---|
| | | Yield | Degree of polymerization | Yield | Degree of polymerization |
| Lactobacillus | 40 | 45 | 750 | 30 | 120 |
| Streptomyces | 40 | 41 | 832 | 32 | 110 |
| Actinomyces | 40 | 43 | 731 | 31 | 110 |
| Nocardia | 40 | 40 | 780 | 30 | 121 |
| Micromonospora | 40 | 44 | 832 | 32 | 105 |
| Thermonospora | 40 | 42 | 785 | 35 | 100 |

As can be seen from this table, the results obtained are fairly close in all cases.

EXAMPLE 3

In this example the procedure of Example 1 was followed except that the enzyme employed was replaced by the enzymes obtained from Pseudomonus and from other strains which were added simultaneously or at different times and orders. The results obtained are summarized in the following table.

TABLE 2

| No. | Enzyme used | Amount of enzyme units/g. starch | Time of addition | Precipitate | | Soluble part | |
|---|---|---|---|---|---|---|---|
| | | | | Yield | Degree of polymerization | Yield | Degree of polymerization |
| 1 | Pseudomonus / Escherichia | 20 / 20 | Simultaneous | 45 | 770 | 30 | 110 |
| 2 | Pseudomonus / Micrococcus | 20 / 20 | Initial stage / Middle stage | 41 | 785 | 32 | 120 |
| 3 | Pseudomonus / Azotobacter | 20 / 20 | Middle stage / Initial stage | 43 | 790 | 30 | 100 |

The reaction was carried out 48 hours at pH 5.5 and 45° C. No difference could be observed when the time or order of additions were changed. It is to be noted that the Pseudomonus enzyme mixed with other enzymes showed a certain decrease of branching compared with the case of using Pseudomonus enzyme alone.

EXAMPLE 4

In this example amylomaize starch was gradually heated at a concentration of 10% and pH of 6.0 under agitation in a nitrogen gas stream to obtain paste of high viscosity. The paste obtained was rapidly cooled to 60° C., then mixed with heat resistant enzyme produced by Streptomyces in an amount of 20 units/g. starch with agitation. After lowering of viscosity for one hour, the temperature was lowered to 50° C. Then the enzyme of Pediococcus was added in an amount of 20 units/g. starch, the temperature was lowered to 45° C. and reaction was carried out for 45 hours. The reaction mixture obtained was concentrated to ½ of the original volume and made to stand overnight, and the resulting precipitate was separated by centrifuging, suspended in equal amount of water, again centrifuged and dried in vacuum. The yield obtained was 80%. Further product of yield of 10% could be obtained similarly by concentrating and cooling the liquid after separation. The degrees of polymerization were 550 and 105 respectively in the former and latter products. The process which was otherwise fairly difficult to operate due to high viscosity was considerably facilitated by two-step reaction. The amylose once washed with water was spray dried from a concentration of 20–30% to obtain stable porous crystalline powder.

EXAMPLE 5

Amylomaize starch was treated similarly as in Example 4, then cooled to 60° C. and mixed with 15 units of Lactobacillus enzyme, and the viscosity thereof was lowered at pH 6.0. After cooling by standing for one hour, the paste was regulated to pH 4.0, added with Pseudomonus enzyme in an amount of 20 units/g. starch and reacted for 48 hours at 45° C. The resulting precipitate was separated by centrifuging, and the remaining liquid was concentrated in vacuum to ⅓ of the original volume and allowed to stand overnight, and the resulting precipitate was separated by centrifuging and dried in vacuum. The yield was 30 and 60% respectively. The degree of polymerization of the former product was found to be 650.

Also in this case the separation of precipitate was facilitated by the use of the enzyme of Pseudomonus.

EXAMPLE 6

In this example the starch suspension was preheated to 50° C., then made to pass through a vacuum degassing tank in order to prevent oxidation by air and sent to a totally closed continuous type liquifying apparatus with agitator (Japanese Pat. 426,978). More detailedly, the amylomaize suspension of 10% concentration was regulated to pH 6.0, preheated to 50° C., then degassed and introduced under pressure into continuous type apparatus. Completely homogeneous paste could be obtained after a stay period of five minutes while the temperature of liquifying vessel was regulated to 100° C. with steam. Then the paste was cooled to 60° C. by spraying into vacuum cooling device, added with heat resistant enzyme obtained from Thermonospora strain in an amount of 20 units/g. starch and cooled to 45° C. under agitation during one hour. The paste was further added with Escherichia enzyme in an amount of 15 units/g. starch and reacted for 40 hours at pH 6.0 and at 45° C. The resulting reaction mixture was concentrated to ½ of the original volume and gradually cooled to 5° C. during 12 hours. Resulting precipitate was separated by centrifuging, then washed with equal amount of water and dried to obtain product with the yield of 75% and degree of polymerization of 750.

EXAMPLE 7

Similarly as in Example 6, amylomaize starch was preheated to 50° C., then degassed, introduced under pressure into continuous liquifying apparatus and liquified at 100° C. The obtained paste was cooled to 50° C. in a vacuum cooling vessel and simultaneously added with Pseudomonus enzyme in an amount of 30 units/g. starch. After cooling, the mixture was stirred for 1 hour in a mixing tank to lower the temperature to 45° C., then transferred to a reacting tank and reacted at pH 4 and at 45° C. After the completion of 48 hours, the mixture was made to stand for 4 hours, and the resulting precipitate was separated. The mother liquor was concentrated to ½ of the original volume and cooled for 12 hours and the resulting precipitate was separated by centrifuging, and united with the former precipitate. The united precipitate was washed with equal amount of water, then centrifuged and dried. The yield and degree of polymerization of the product were 78% and 520 respectively.

EXAMPLE 8

In this example the procedure of Example 7 was followed except that the enzyme was replaced by 15 units/g. starch of Pseudomonus enzyme and 20 units/g. starch of Nocardia enzyme. The reaction was carried out for 40 hours at 45° C., and the reaction mixture was concentrated to ½ of the original volume to obtain amylose in a yield of 80%. The degree of polymerization of the product was 550.

EXAMPLE 9

In this example potato starch was treated similarly as in Example 7. Starch suspension of 10% concentration was liquified at pH 4.0 and by the addition of Pseudomonus enzyme in 40 units/g. starch. The precipitate obtained after reaction for 48 hours was separated by centrifuging, suspended in equal amount of water, then centrifuged and dried under vacuum to obtain product with a yield of 17% and degree of polymerization of 430. The mother liquor was concentrated to ½ of the original volume, and gradually cooled for 12 hours, and the resulting precipitate was separated by centrifuging. After washing once with water, the product was dried in vacuum to obtain a yield of 65%. The degree of polymerization was found to be as low as 50.

The product obtained in this example was mixed and spray dried from a concentration of 30% to obtain porous powder.

It will be obvious to those skilled in the art that various changes may be made without departing from the scope of the invention and the invention is not to be considered limited to what is described in the specification.

What is claimed is:

1. A process for producing amylose chiefly composed of macromolecular amylose from compositions of starch containing at least 50% amylose or compositions of crude amylose comprising the steps of:
    gelatinizing said composition at a temperature as low as possible within the range of 70–130° C.;
    rapidly cooling said gelatinized composition to a temperature within the range of 50–60° C. and mixing and treating with a heat resistant α-1,6-glucosidase at said temperature;
    further cooling the reaction mixture to a temperature of 40–50° C.;
    mixing and treating with a second α-1,6-glucosidase at said lower temperature thereby completing debranching of said composition and permitting precipitation of the amylose; and
    separating the precipitated amylose from the resulting solution.

2. A process according to claim 1 wherein said second α-1,6-glucosidase consists of a mixture of two alpha-1,6-glucosidase enzymes of different properties.

3. A process according to claim 2 wherein said two alpha-1,6-glucosidase enzymes are added at different times.

4. A process according to claim 1 wherein said heat resistant alpha-1,6-glucosidase employed as an enzyme produced by strains of Lactobacillus or Actinomycetes.

5. A process for producing amylose in accordance with claim 4 wherein said heat resistant α-1,6-glucosidase is an enzyme produced by a strain selected from the group consisting of *Lactobacillus brevis* IFO 3345, *Lactobacillus plantarum* ATCC 8008, *Stre ptomyces diastatochromogenes* IFO 3337, *Actinomyces globisporus* IFO 12208, *Nocardia asteroides* IFO 3384, *Micromonospora melanospora* IFO 12515, and *Thermonospora viridis* IFO 12207.

6. A process according to claim 1 wherein said second alpha-1,6-glucosidase employed is an enzyme produced by a strain selected from the group consisting of *Pseudomonus amyloderamosa* ATCC 21262, *Escherichia intermedia* ATCC 21073, *Agrobacterium tumefaciens* IFO 3085, *Azotobacter indicus* IFO 3426, *Mycobacterium phlei* IFO 3158, *Micrococcus lysodeikticus* IFO 3333, *Pediococcus acidilactici* IFO 3884, *Serratia indica* IFO 3759, *Streptococcus fecalis* IFO 3128, *Staphylococcus aureus* IFO 3128, and *Staphylococcus aureus* IFO 3061.

7. A process according to claim 1 wherein said gelatinizing step is performed without contact with air thereby preventing oxidation.

8. A process according to claim 1 further comprising, between said mixing step and said separating step, the step of introducing said mixture into a holding tank which already contains a large amount of reaction mixture in which hydrolysis is already proceeding.

9. A process according to claim 1 further including the step of converting the precipitated amylose into a porous crystalline powder by vacuum drying or spray drying.

10. A process for producing amylose in accordance with claim 1, wherein said heat resistance α-1,6-glucosidase consists of a mixture of two heat resistant α-1,6-glucosidase enzymes of different properties.

References Cited
UNITED STATES PATENTS

| | | | |
|---|---|---|---|
| 3,556,942 | 1/1971 | Hathaway | 195—31 |
| 3,532,602 | 10/1970 | Seidman | 195—31 |
| 3,560,345 | 2/1971 | Yokobayashi et al. | 195—66 |

OTHER REFERENCES

Sakano et al., Agr. Biol. Chem., vol. 33, pp. 1536–40, 1969.

A. LOUIS MONACELL, Primary Examiner

G. M. NATH, Assistant Examiner